(12) United States Patent
Sage

(10) Patent No.: US 10,612,332 B1
(45) Date of Patent: Apr. 7, 2020

(54) SYSTEM AND METHOD OF UTILIZING A DRONE TO DEPLOY FRAC BALLS IN AN OPEN WELL BORE

(71) Applicant: John Sage, Carnegie, OK (US)

(72) Inventor: John Sage, Carnegie, OK (US)

(*) Notice: Subject to any disclaimer, the term of this patent is extended or adjusted under 35 U.S.C. 154(b) by 68 days.

(21) Appl. No.: 15/951,128

(22) Filed: Apr. 11, 2018

Related U.S. Application Data

(60) Provisional application No. 62/638,074, filed on Mar. 3, 2018.

(51) Int. Cl.
| | |
|---|---|
| *B64C 39/02* | (2006.01) |
| *E21B 23/00* | (2006.01) |
| *E21B 33/12* | (2006.01) |
| *E21B 23/08* | (2006.01) |
| *E21B 43/26* | (2006.01) |

(52) U.S. Cl.
CPC ............ *E21B 23/08* (2013.01); *B64C 39/024* (2013.01); *E21B 23/00* (2013.01); *E21B 33/12* (2013.01); *B64C 2201/126* (2013.01); *B64C 2201/128* (2013.01); *B64C 2201/146* (2013.01); *E21B 43/26* (2013.01)

(58) Field of Classification Search
CPC ............................. E21B 23/08; B64C 39/024
See application file for complete search history.

(56) References Cited

U.S. PATENT DOCUMENTS

| | | | | |
|---|---|---|---|---|
| 2004/0042884 A1* | 3/2004 | Jester | ................... | A63B 47/021 414/501 |
| 2016/0075422 A1* | 3/2016 | Goldstein | ................ | B64B 1/66 244/30 |
| 2016/0144959 A1* | 5/2016 | Meffert | ................ | B64C 39/024 701/3 |
| 2016/0169772 A1* | 6/2016 | Olmedo | ................... | G01N 1/08 73/864.32 |
| 2016/0214715 A1* | 7/2016 | Meffert | ................ | B64C 39/024 |
| 2017/0328814 A1* | 11/2017 | Castendyk | ............ | B64C 39/024 |
| 2019/0322342 A1* | 10/2019 | Dabbous | ................ | E21B 41/04 |

OTHER PUBLICATIONS

Dictionary definition of "drone", accessed Nov. 8, 2019 via thefreedictionary.com.*

* cited by examiner

*Primary Examiner* — Blake E Michener
(74) *Attorney, Agent, or Firm* — Michael Diaz

(57) ABSTRACT

A system includes an aerial drone having a dispensing mechanism and a remote control for wirelessly controlling movement of the aerial drone and the dispensing mechanism. The dispensing mechanism includes a storage area for storing a frac ball and a device for remotely releasing the frac ball from the drone. The aerial drone is remotely controlled to position the drone over the open well bore and where the frac ball is released into the open well bore.

13 Claims, 8 Drawing Sheets

SYSTEM AND METHOD OF UTILIZING A DRONE TO DEPLOY FRAC BALLS IN AN OPEN WELL BORE

RELATED APPLICATIONS

This utility application claims the benefit of U.S. Provisional Patent Application Ser. No. 62/638,074 filed Mar. 3, 2018 by John Sage, which is hereby incorporated by reference.

BACKGROUND OF THE INVENTION

Field of the Invention

The invention relates to oil and gas system and methods. Specifically, and not by way of limitation, the present invention relates to a system and method of utilizing a drone to deploy frac balls in an open well bore or other open bore.

Description of the Related Art

Fracking, which is also known as hydraulic fracturing, is a method of artificially stimulating oil and gas wells by using pressurized water or other fluids forced into boreholes and finally into fossil fuel reservoirs. This forced pressurized fluid "fractures" rock formations, which assist in retrieving more hydrocarbon resources to the surface. During the fracking process, a fluid mixture, usually consisting of water, sand and other chemical additives is pumped under high pressure into the shale formation to create small fractures. The mixture is mostly water and sand with a very small percentage of special-purpose additives. These fractures are then "propped" open by the sand, which allows the natural gas or other hydrocarbons to flow into the well bore where it is subsequently collected at the surface. One important tool used by fracking operators oftentimes includes specially sized "frac balls". These frac balls are injected into a well bore and utilized to block or close off portions of a well, thereby allowing pressure to build up and cause fracturing in a targeted section of the well. Frac balls are sized to fit in a specific well-bore or sliding sleeves inserted in the well-bore. These well bores and sliding sleeves may vary in diameter as the well sections progress from upper to lower (or end) sections.

At the surface, the well bore is capped with a wellhead which usually includes valves and a bloc, often called a frachead, which provides fluid conduits for the introduction of stimulation fluids used in the fracking process. Typically, frac balls are manually inserted into the well-bore at either the frachead or an auxiliary line coupled to a valve and then the well-bore. This operation requires personnel to work in close proximity to various fluid lines where fluid and frac balls are pumped at high pressures and rates. The treatment fluid, as it is energized, can be quite dangerous to be near. Additionally, frac ball insertion devices are constructed and placed at near insertion point, which can be quite costly and time-consuming for the operators to set up.

It would be advantageous to have a system and method of inserting the frac balls without requiring personnel to get close to the treatment lines or frachead or requiring costly device set-ups for the insertion of these frac balls. It is an object of the present invention to provide such a system and method.

SUMMARY OF THE INVENTION

In one aspect, the present invention is a system of utilizing an aerial drone to dispense frac balls into an open well bore. The system includes an aerial drone having a dispensing mechanism and a remote control for wirelessly controlling movement of the aerial drone and the dispensing mechanism. The dispensing mechanism includes a storage area for storing a frac ball and a device for remotely releasing the frac ball from the drone. The aerial drone is remotely controlled to position the drone over the open well bore and where the frac ball is released into the open well bore.

In another aspect, the present invention is directed to a method of deploying frac balls into an open well bore. The method begins by affixing a dispensing mechanism to a remotely controlled aerial drone. Next, a frac ball is retained within the dispensing mechanism. The drone is then remotely operated to a position over the open well bore and the frac ball is deployed from the dispensing mechanism.

In a different embodiment, the present invention is directed to a method of deploying frac balls into an open well bore using a hollow tube. The method begins by affixing the hollow tube to a bottom of a drone. One or more frac balls are retained within an interior of the hollow tube. The frac ball is held in place by a moveable and remotely operable actuating arm. The drone is remotely operated to a position over the open well bore. The frac ball is then deployed by opening the actuating arm to allow the frac ball to be released from a bottom portion of the hollow tube into the open well bore.

DESCRIPTION OF THE INVENTION

Figure 1:
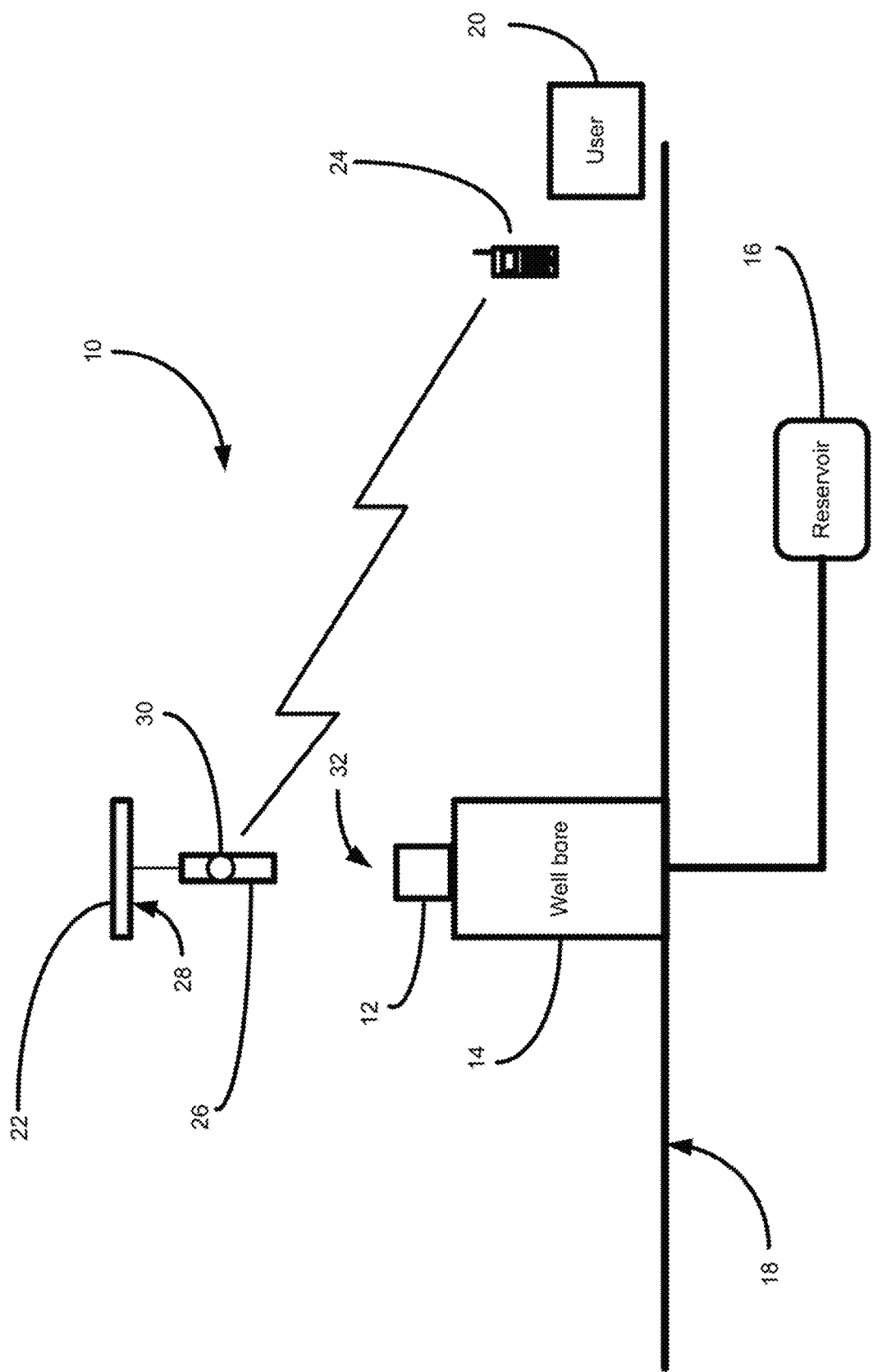
FIG. 1 is a simplified block diagram of the components of the frac ball dispensing system.

The present invention is a system and method of utilizing a drone to deploy frac balls in an open well bore or treatment line. FIG. 1 is a simplified block diagram of the components utilized in a frac ball dispensing system 10. The system 10 includes a wellhead 12 capping a well bore 14 leading to an underground reservoir 16 located below a surface 18. A user 20 controls an aerial drone 22 through a remote control unit 24. The drone 22 includes a dispensing mechanism 26, preferably positioned below a bottom portion 28 of the drone. The dispensing mechanism 26 dispenses frac balls 30 into an opening 32 of the well bore 14.

Figure 2:
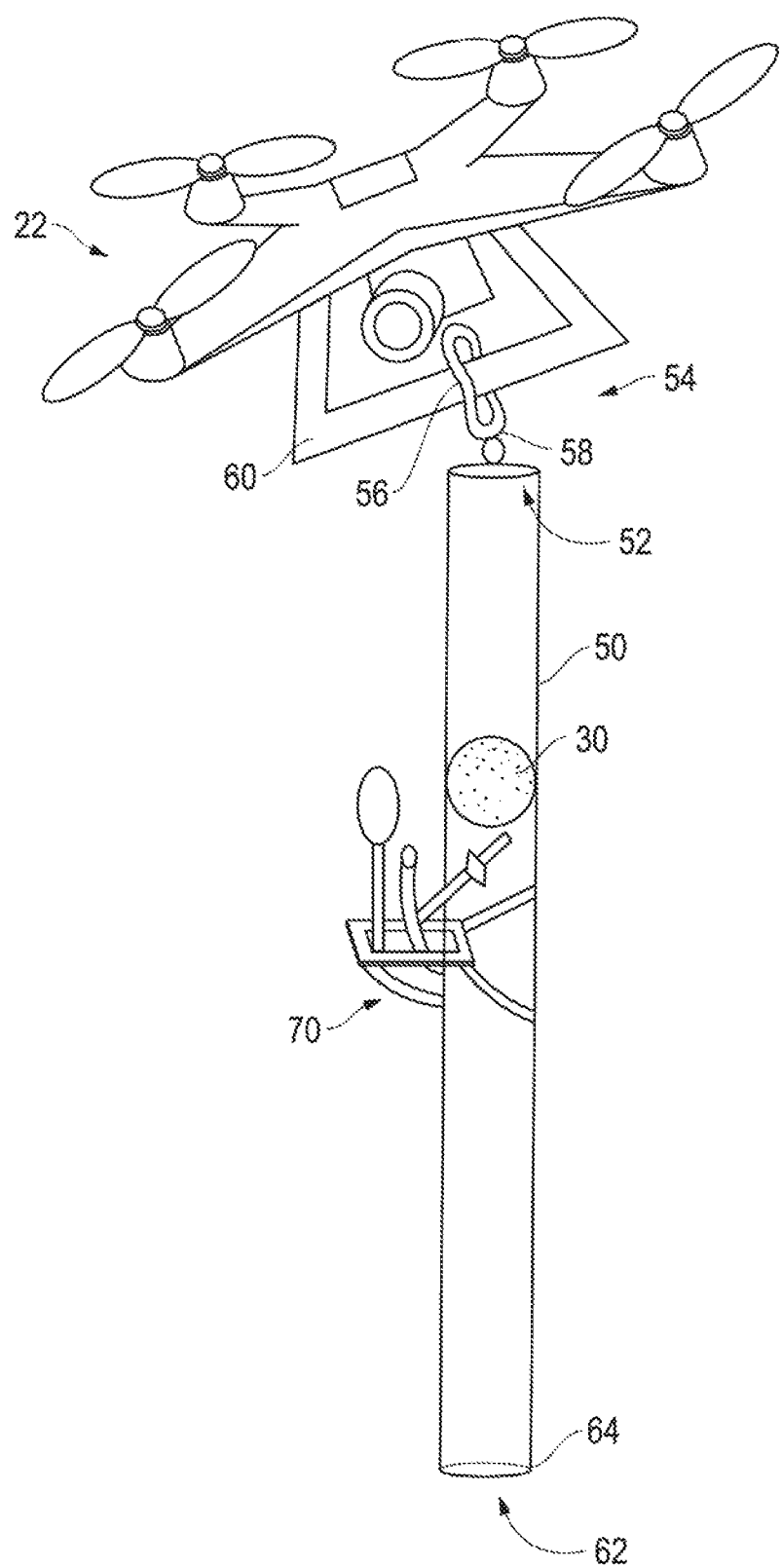
FIG. 2 is a front view of the aerial drone with the dispensing mechanism in one embodiment of the present invention.

FIG. 2 is a front view of the aerial drone 22 with the dispensing mechanism 26 in one embodiment of the present invention. The dispensing mechanism may include a hollow tube 50 which houses the frac balls 30 and is utilized as a directional aiming device for accurately dispensing the frac balls in the desired opening of the well bore 14 or portion of the wellhead 12. The tube is open-ended, preferably on both sides. On an upper side 52 of the tube 50, the tube may include a fastening device 54 for fastening to the bottom of the drone 22. In one embodiment, the fastening device may include a small cable portion 56 and a hook 58 for affixing to a rack 60 of the underside of drone 22. An opening 62 is located on an opposing lower side 64 of the tube to dispense the frac balls through. An actuating arm (or servo) 70 is located within the tube for engaging and retaining frac balls 30 within the interior of the tube 50. The actuating arm may be remotely controlled through the remote control 24. When the actuating arm is engaged, the frac ball is allowed to drop through the tube and out through the opening 62. When the actuating arm is disengaged, the actuating arm moves to a position to obstruct the passageway of the interior of the tube 50, thereby preventing the frac ball from exiting the tube. Frac ball diameters may vary in size to fit appropriately for the diameter of a specific well bore 14. The aerial drone may be any remotely controlled, pilotless, flying drone. Preferably, the aerial drone is controlled by the user 20 wirelessly through the remote control 24 and is capable of hovering or near hovering operations.

Figure 3:
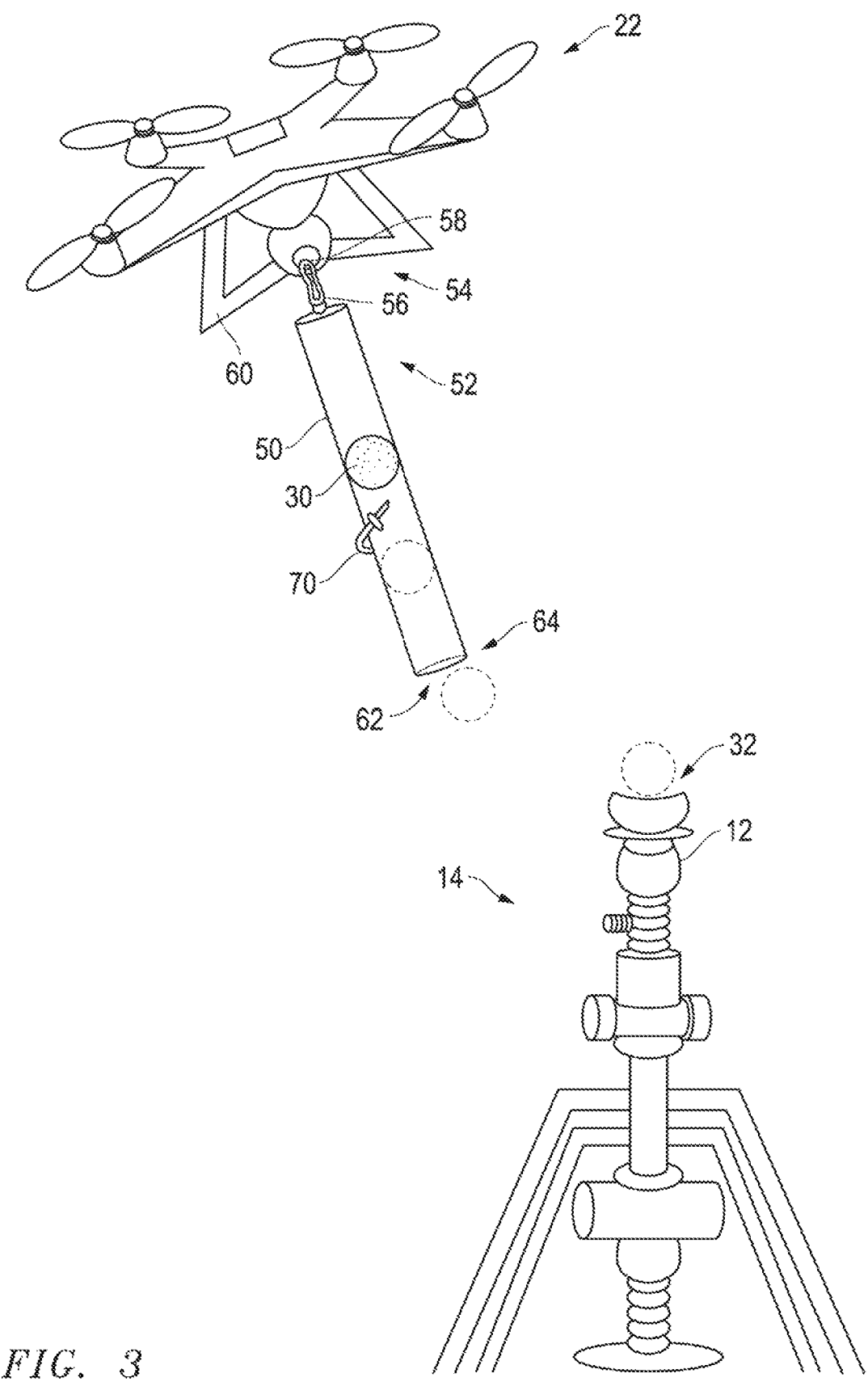
FIG. 3 illustrates the drone approaching the wellhead in the embodiment of FIG. 2.
Figure 4:
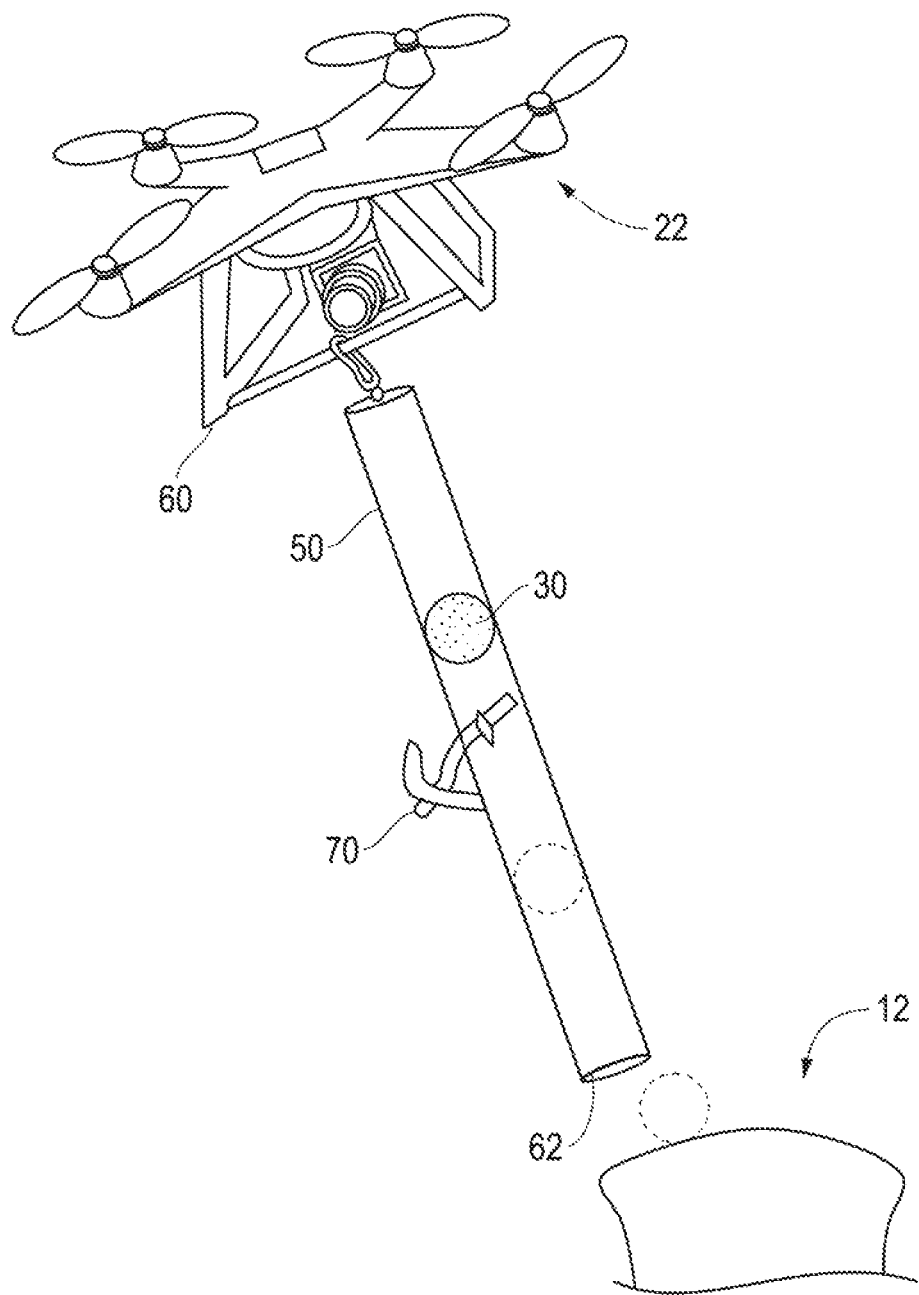
FIG. 4 illustrates the drone directly overhead the wellhead.

FIG. 3 illustrates the drone 22 approaching the wellhead 12 in the embodiment illustrated in FIG. 2. FIG. 4 illustrates the drone 22 directly overhead the wellhead 12. The user 20 remotely operates the drone 22 to a hovering position directly above the opening for the well bore 14. When the tube is directly over the opening of the well bore, the frac ball may be dispensed, gravity enabling the frac ball to fall when the actuating arm 70 is engaged.

Figure 5:
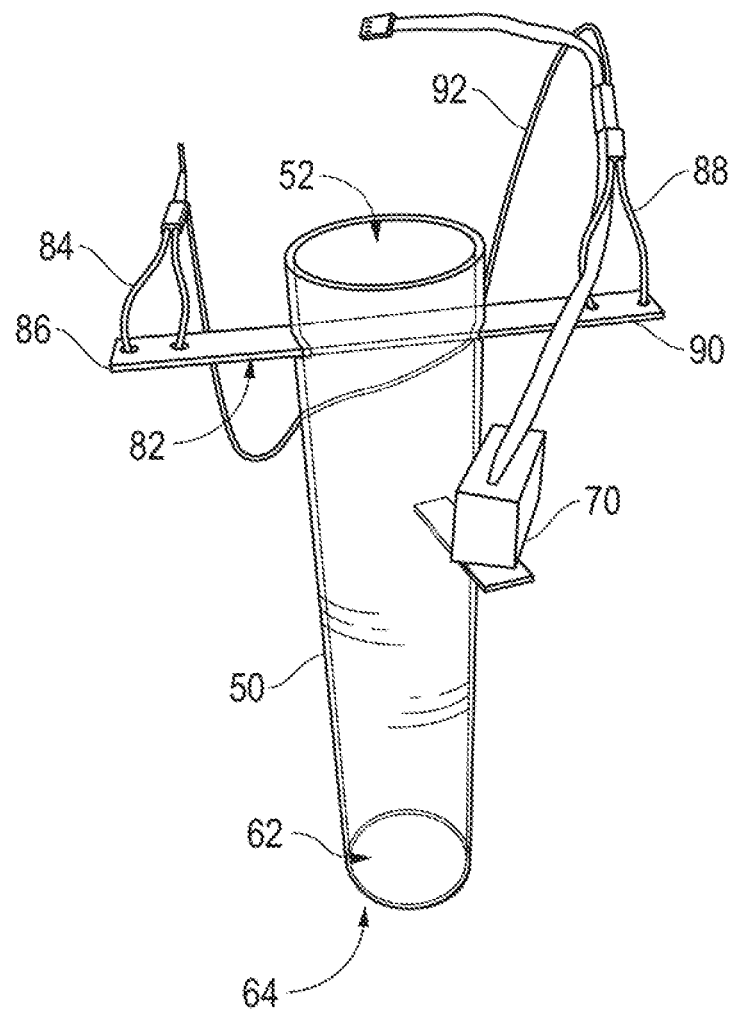
FIG. 5 is a front view of the tube separated from the drone in a second embodiment of the present invention.
Figure 6:
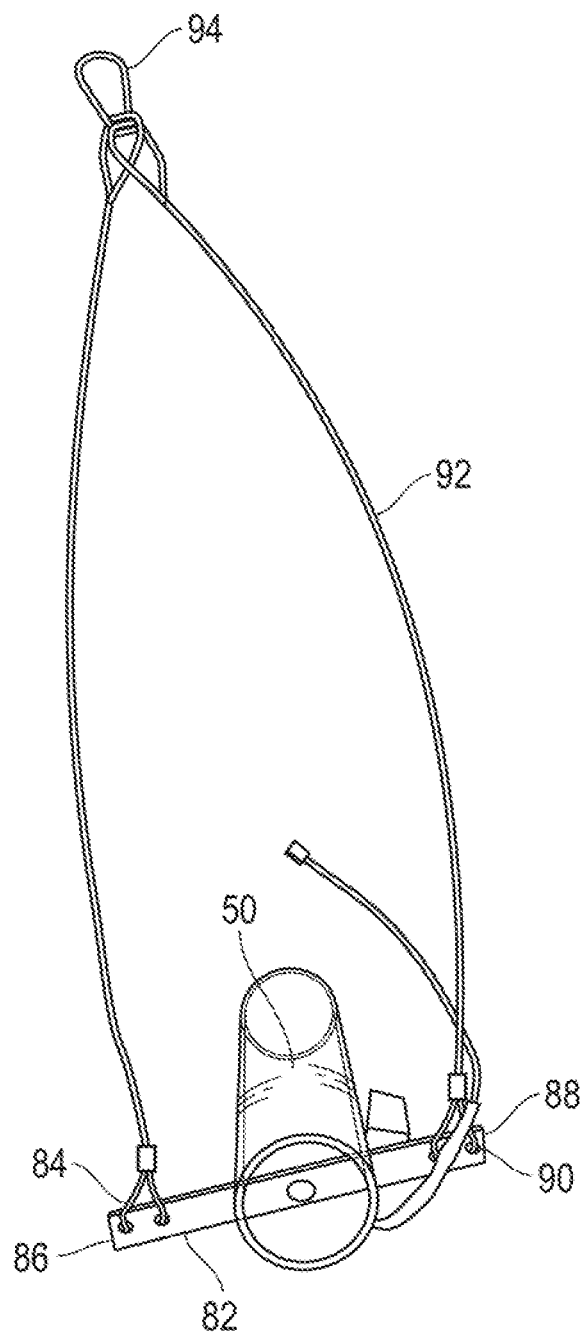
FIG. 6 is a top view of the tube of FIG. 5.
Figure 7:
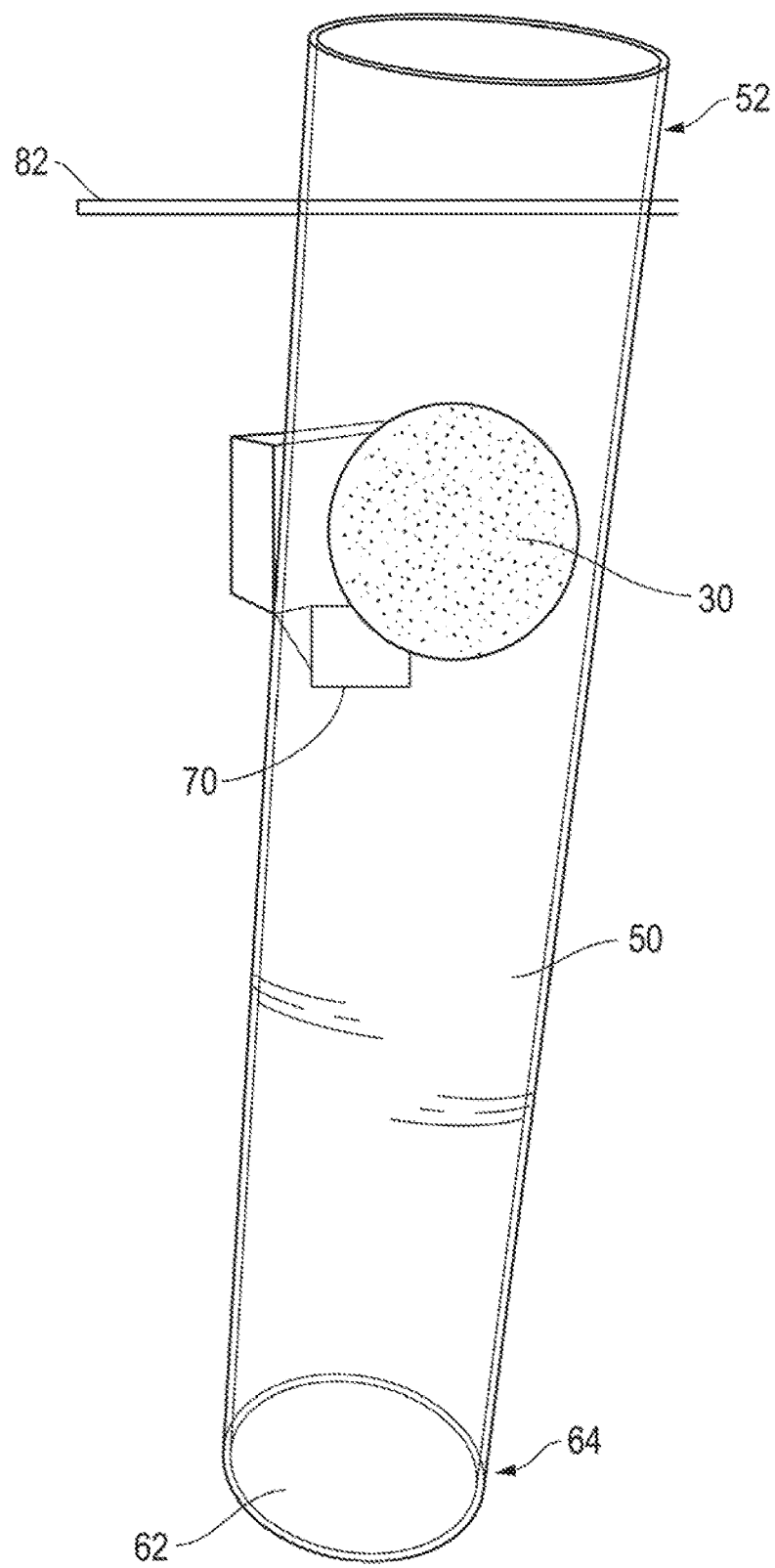
FIG. 7 is a front view of the tube of FIG. 5 with a frac ball resting inside the interior of the tube.

FIG. 5 is a front view of the tube 50 separated from the drone 22 in a second embodiment of the present invention. FIG. 6 is a top view of the tube 50 of FIG. 5. FIG. 7 is a front view of the tube 50 of FIG. 5 with a frac ball 30 resting inside the interior of the tube 50. In this second embodiment, the tube 50 is attached in a different configuration to the drone 22 using a fastening mechanism 80. The fastening mechanism 80 includes a spreader arm 82 affixed to the tube. In this configuration, the spreader arm extends outwardly on opposing sides of the tube 50. One cable end 84 is affixed to a first end 86 of the spread arm while a second cable end 88 is affixed to a second end 90 of the spreader arm. The cable ends 84 and 88 are located on opposing ends of a continuous cable 92. The cable 92 includes a loop 94 situated approximately at the middle of the cable. The loop 94 may be used for attaching to the drone 22 by using a hook 88 or other fastener. In this second embodiment, the tube is allowed to hang down from the cable 92, which is attached to the bottom of the drone, such as at the rack 60. As the cable and attached tube are allowed to freely swing down from the drone, the tube is always oriented perpendicular to the surface, without requiring the drone to be orientated parallel to the ground. Thus, if the drone is orientated nose high or low, the tube will always hang down from the drone, perpendicular to the ground.

With reference to FIGS. 1-7, the operation of the system 10 will now be explained. First, a frac ball or balls are loaded into the interior of the tube 50. The actuating arm 70 is disengaged, which enables the arm 70 to obstruct the passageway of the interior of the tube and prevent the frac ball 30 from leaving through the opening 62. The tube is attached to the drone 22. The user 20 remotely controls the drone 22 through the remote control 24. The drone is positioned to a hover position over the desired entry point of the well bore 14. The user then remotely engages the actuating arm 70, which moves the arm away from the interior of the tube, allowing the frac ball to be released or dispensed via gravity out the opening 62. The tube acts as a directional aim device, allowing the accurate dispensing of the frac ball as desired by the user. The drone may then be flown back to a location where the drone can be reloaded as desired.

Figure 8:
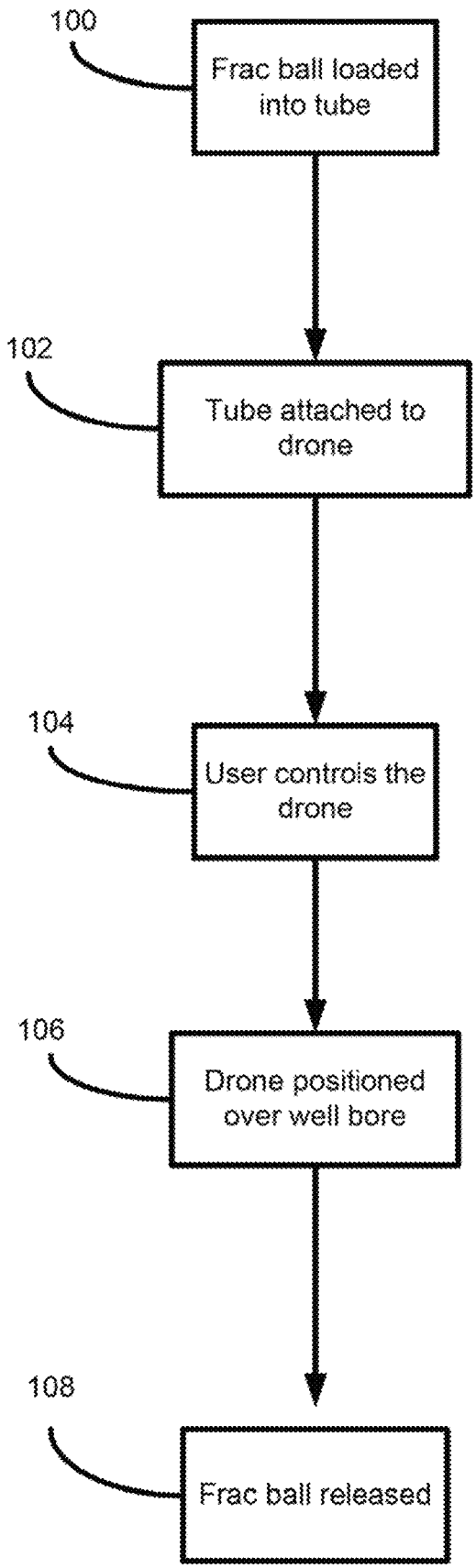
FIG. 8 is a flow chart illustrating the steps of a method of dispensing frac balls from the aerial drone into the well bore according to the teachings of the present invention.

FIG. 8 is a flow chart illustrating the steps of a method of dispensing frac balls from the drone 22 into the well bore 14 according to the teachings of the present invention. With reference to FIGS. 1-8, the steps of the invention will now be explained. The method begins with step 100 where a frac ball or balls are loaded into the interior of the tube 50. During this loading process, the actuating arm 70 is disengaged, which enables the arm 70 to obstruct the passageway of the interior of the tube and prevent the frac ball 30 from leaving through the opening 62. Next, in step 102, the tube is attached to the drone 22. In step 104, the user 20 remotely controls the drone 22 through the remote control 24. In step 106, the drone is positioned to a hover position over the desired entry point of the well bore 14. The method then moves to step 108, where the user then remotely engages the actuating arm 70, which moves the arm away from the interior of the tube, allowing the frac ball to be released or dispensed via gravity to the desired opening. The tube acts as a directional aim device, allowing the accurate dispensing of the frac ball to a location as desired by the user. The drone is then flown to a retrieval area where further reloading may be completed.

The dispensing mechanism discussed in FIGS. 1-8 illustrates one configuration for dispensing the frac balls. However, it should be understood, the present invention may utilize any type of dispensing mechanism which enables a frac ball to be retained by the remotely operated drone and released remotely.

The present invention provides many advantages over existing systems and methods for dispensing frac balls into a well bore. The present invention enables the remote and safe insertion of frac balls into a well bore without the user having to be in close proximity to the well bore. Additionally, the present invention enables the dispensing of frac balls into the well bore without having to set up an expensive and time-consuming fixed frac dispensing unit directly above the well bore.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:
1. A system of utilizing an aerial drone to dispense frac balls into an open well bore, the system comprising:
   an aerial drone having a dispensing mechanism; and
   a remote control for wirelessly controlling a movement of the aerial drone and the dispensing mechanism;
   wherein the dispensing mechanism includes a storage area for storing a frac ball and a device for remotely releasing the frac ball from the drone;

wherein the aerial drone is positioned over the open well bore and the frac ball is released into the open well bore.

2. The system according to claim 1 wherein the dispensing mechanism includes a tube having an open lower end for dispensing the frac ball.

3. The system according to claim 2 wherein the dispensing system includes a remotely operable and moveable actuating arm for retaining the frac ball within the tube.

4. The system according to claim 1 wherein the dispensing mechanism is attached by a cable to an underside of the drone.

5. The system according to claim 4 wherein the dispensing mechanism includes:
   a tube having an open lower end for dispensing the frac ball;
   wherein the tube includes a spreader arm for attaching the cable to the tube.

6. The system according to claim 1 wherein:
   the dispensing mechanism includes a hollow tube with an open lower end and a remotely operable and moveable actuating arm for retaining the frac ball within the tube;
   the actuating arm being remotely engaged to allow the frac ball retained in the tube to be released through the open lower end of the tube.

7. The system according to claim 1 wherein the drone includes a hover capability to hover over a specific location.

8. A method of deploying frac balls into an open well bore, the method comprising the steps of:
   affixing a dispensing mechanism to a remotely controlled aerial drone;
   retaining a frac ball within the dispensing mechanism;
   remotely operating the drone to a position over the open well bore; and
   deploying the frac ball from the dispensing mechanism.

9. The method according to claim 8 wherein the dispensing mechanism includes a hollow tube affixed to an underside of the aerial drone.

10. The method according to claim 9 wherein the step of retaining a frac ball includes retaining the frac ball within an interior of the hollow tube.

11. The method according to claim 10 wherein the step of retaining the frac ball within an interior of the hollow tube includes retaining the frac ball with a moveable and remotely operable actuating arm.

12. The method according to claim 11 wherein the step of deploying the frac ball from the dispensing mechanism includes moving the actuating arm to allow the frac ball to be released from a bottom portion of the hollow tube into the open well bore.

13. A method of deploying frac balls into an open well bore, the method comprising the steps of:
   affixing a hollow tube to a bottom of a drone;
   retaining a frac ball within an interior of the hollow tube, the frac ball being held in place by a moveable and remotely operable gate;
   remotely operating the drone to a position over the open well bore; and
   deploying the frac ball by opening the gate to allow the frac ball to be released from a bottom portion of the hollow tube into the open well bore.

* * * * *